(12) United States Patent
Malcolm

(10) Patent No.: US 6,227,501 B1
(45) Date of Patent: May 8, 2001

(54) SENSOR MOUNTING

(76) Inventor: Donald Allan Malcolm, 25 Station Road, Dollar (GB), FK14 7EL ( * ) Notice: Subject to any disclaimer, the term of this patent is extended or adjusted under 35 U.S.C. 154(b) by 0 days.

(21) Appl. No.: 09/202,460

(22) PCT Filed: Jun. 11, 1997

(86) PCT No.: PCT/GB97/01564
§ 371 Date: Sep. 1, 1999
§ 102(e) Date: Sep. 1, 1999

(87) PCT Pub. No.: WO97/48578
PCT Pub. Date: Dec. 24, 1997

(30) Foreign Application Priority Data

Jun. 13, 1996 (GB) .................................................. 9612373

(51) Int. Cl.[7] ................................................ G12B 9/00
(52) U.S. Cl. ........................ 248/27.3; 248/552; 73/1 D
(58) Field of Search .................. 248/27.1, 27.3, 248/552, 224.8; 73/1 D, 1 E

(56) References Cited

U.S. PATENT DOCUMENTS

| 4,134,564 | * | 1/1979 | Hanna | 248/243 |
|---|---|---|---|---|
| 5,414,229 | * | 5/1995 | Rocheleau et al. | 181/150 |
| 5,671,984 | * | 9/1997 | Kodera | 312/114 |
| 5,684,336 | * | 11/1997 | McCurdy | 307/10.1 |
| 5,875,588 | * | 3/1999 | Torii et al. | 49/349 |
| 5,947,436 | * | 7/1999 | Bucher et al. | 248/345 |
| 6,003,371 | * | 12/1999 | Okada | 73/504.02 |

FOREIGN PATENT DOCUMENTS 0 131 654 A1   1/1985 (EP) .

OTHER PUBLICATIONS

Patent Abstracts of Japan, vol. 096, No. 007; JP 08 074825A, Niles Parts Co. Ltd., Mar., 19, 1996.

* cited by examiner

Primary Examiner—Ramon O. Ramirez
Assistant Examiner—Walter Landry

(57) ABSTRACT

A mounting for attaching a sensor (10) in a vehicle bumper comprises a housing (12) within which a sensor holder (14) can be angularly adjusted. The sensor holder (14) has a part-spherical surface which is biased against a part-spherical seat (22) within the housing (12) by means of a spring (28) acting through a bearing rest (26) and a bearing cup (24), these parts being retained within the housing (12) by a thrust washer (30) and a retaining clip (32).

8 Claims, 2 Drawing Sheets

SENSOR MOUNTING

This invention relates to a sensor mounting particularly, but not exclusively, for mounting a sensor of a reversing aid system at a vehicle bumper (fender).

Systems for indicating the presence of an obstruction behind the vehicle to the driver when reversing use a plurality of ultrasonic or other electromagnetic sensors mounted at the rear of the vehicle. The orientation of the sensors must be correctly aligned for the system to operate correctly.

Known systems have fixed sensors mounted on brackets at the rear of the vehicle or at the vehicle's bumper. A specific mounting or bracket is thus required for every different model of vehicle to ensure correct sensor alignment.

Systems are also being developed which are relatively insensitive to sensor orientation, but these rely on more expensive sensor transducers and additional electronic processing, or which make use of software to compensate for angular misalignment. However, such proposals involve significant additonal costs.

The present invention provides a sensor mounting comprising a housing, a sensor holder secured within the housing for adjustment about two axes, and means for maintaining the sensor holder in a fixed orientation within the housing after adjustment.

Preferably, the housing has a part-spherical internal surface engaging a part-spherical outer surface of the sensor holder, whereby the orientation of the sensor holder with respect to the housing may be continuously adjusted.

Said maintaining means may suitably comprise resilient means acting between the housing and the sensor holder.

The housing is preferably adapted to be secured in a vehicle bumper. Typically, the housing has a generally cylindrical outer shape for reception in a circular aperture in a vehicle bumper, and a front flange for abutting against the outer surface of the vehicle bumper.

Teeth may be provided on the outer surface of the housing adjacent the rear of said flange, to grip the vehicle bumper.

The housing may suitably comprise a front portion defining a cavity in which the sensor holder can be inserted, and a rear portion retaining the sensor holder within the housing. The rear portion may be held within the front portion by a spring clip.

The sensor may be an ultrasonic or other sensor. It may be a transmitter, receiver, or transceiver.

The mounting facilitates mounting a sensor at a bumper, for example, for retrofitting of a reversing aid system. The adjustability provided by the mounting alleviates the criticality of the position and orientation of the mounting itself. It may enable the mounting to be arranged, for example, on a downwardly directed portion of a curved bumper with the sensor orientated within the mounting for correct operation.

The invention will now be described, by way of example only, with reference to the accompanying drawings, in which.

Figure 1:
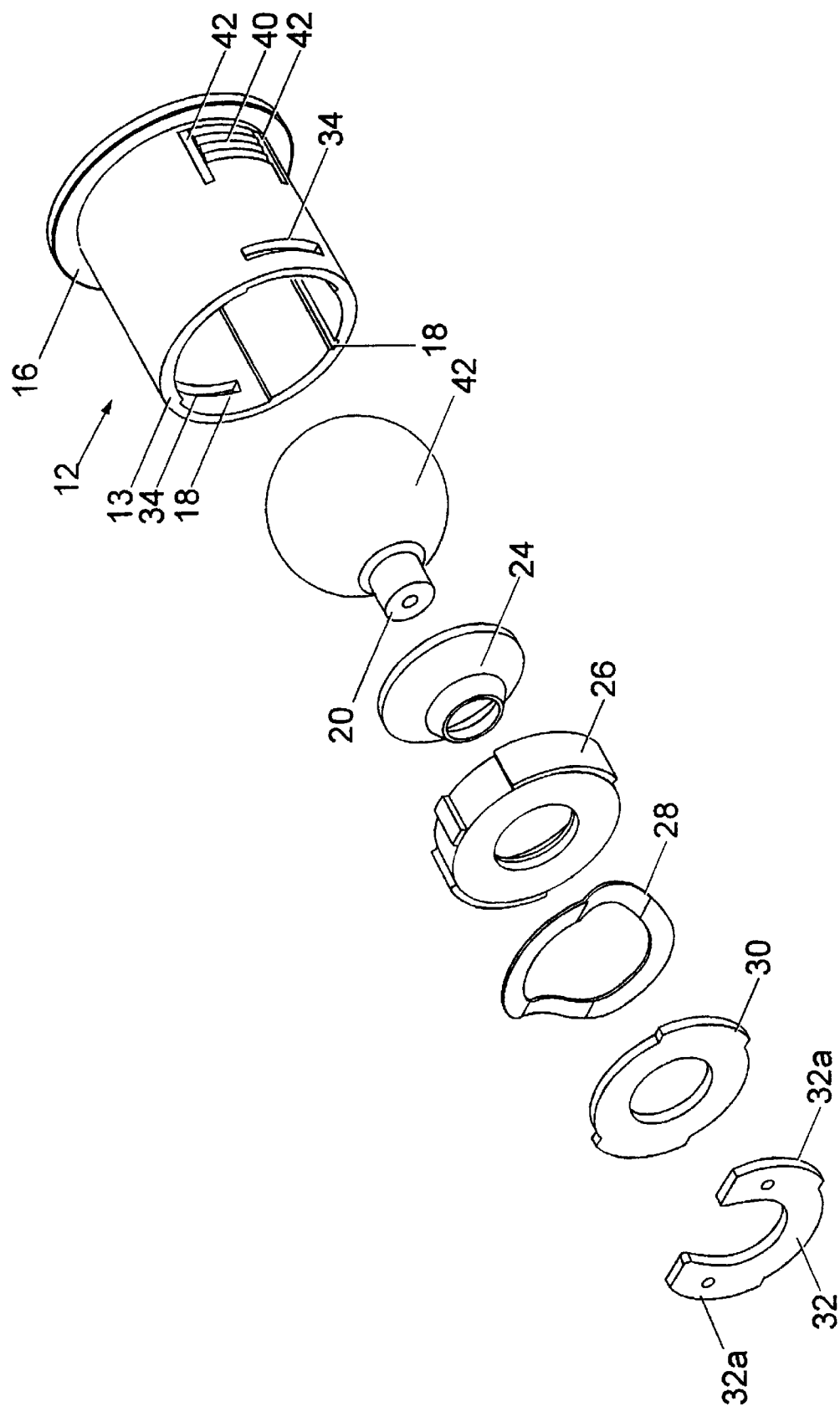
FIG. 1 is an exploded perspective view of a sensor assembly embodying the invention.

Referring to the drawings, a sensor 10 (FIGS. 2 to 4) is mounted to a panel such as a vehicle bumper (not shown) by a sensor housing to be described. The sensor 10 will typically be an ultrasonic transmitter/receiver forming part of a vehicle reversing aid, but could alternatively be an infra-red or microwave sensor.

The sensor mounting comprises a housing 12 and a sensor holder 14.

The housing 12 has a body 13 of generally cylindrical formation with a front flange 16 and an internal surface formed with axial slideways 18. The sensor holder 14 is suitably of an elastomeric material defining an internal cavity in which the sensor 10 is resiliently gripped, and an outer surface in the form of a part sphere with a projecting cylindrical tail 20.

Figure 2:
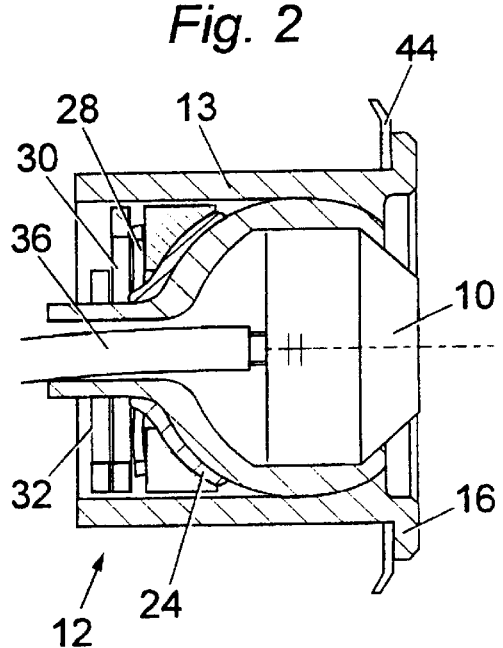
FIG. 2 is a cross-sectional side elevation of the assembly of FIG. 1 in a first configuration.
Figure 3:
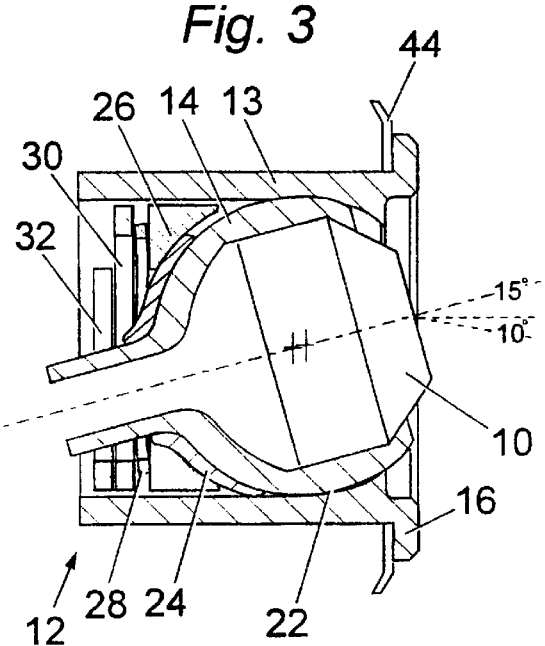
FIG. 3 is a similar view to that of FIG. 2 but in a second configuration.
Figure 4:
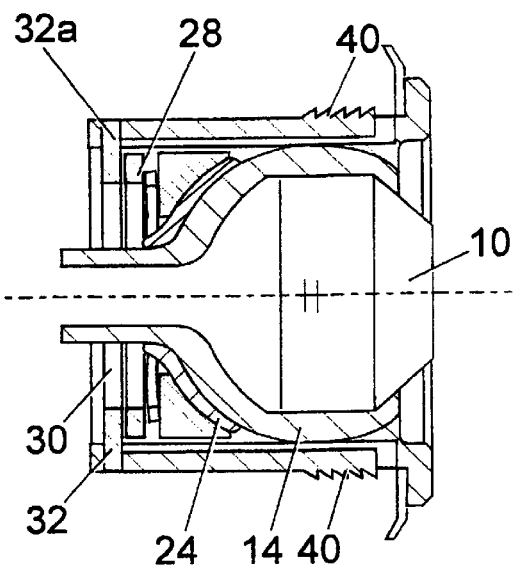
FIG. 4 is a cross-sectional plan view of the assembly.

As seen in FIGS. 2 to 4, the interior of the housing body 13 is formed in its front portion to provide a part-spherical bearing surface 22 within which the part-spherical sensor holder 14 may be rotated about x and y axes.

The sensor holder 14 is retained within the housing body 13 by means of a bearing cup 24 and a bearing rest 26. The bearing cup 24 is suitably of a low friction material. The bearing rest 26 is urged in the forward direction by a spring, in this instance in the form of a wave washer 28, acting between the bearing rest 26 and a thrust washer 30 retained in position by a spring clip 32 having opposed lugs 32a engaging in slot 34 towards the rear of the housing 12.

The sensor is connected to appropriate circuitry by a cable 36 (shown in FIG. 2 only). In the case of an ultrasonic sensor, if a screened cable is used then the appropriate electronics may all be at a remote location. In an alternative arrangement, a preamplifier may be mounted behind the sensor within the sensor holder 14, in which case an unscreened cable may be used.

The housing 12 is provided with serrations 40 on resilient fingers formed between slots 42 (FIG. 1) in the material of the housing body 13. In this way, the sensor mounting can be inserted into a hole of appropriate size drilled in a vehicle bumper, and will be held in position by the serrations 40 gripping on the edge of the hole. A trim washer 44 (FIGS. 2 to 4) may be provided between the flange 16 and the vehicle bumper to cover any irregularities in the hole. Once the assembly is in the selected position on the bumper, the angular orientation of the sensor 10 may be adjusted from the exterior simply by pushing its front face with the finger against the resilience of the spring 28 and rotating until the desired orientation is achieved. The sensor 10 is then released and is retained in that orientation by the spring 28 urging the sensor holder 14 against the housing 12. A typical automobile installation will require the capability of adjusting to 15° above and 10° below the horizontal and 5° to either side, and it is therefore convenient to permit angular adjustment of slightly more than 15° in all directions.

In a typical arrangement, the parts 12, 26, 30 and 32 may suitably be formed by injection moulding of UV stabilised ABS.

Although described with particular reference to mounting in a vehicle bumper, the sensor assembly may be mounted in other ways, for example on a bracket secured within a plastic bumper, on a bracket secured to a vehicle underbody, or within a box secured to a vehicle body.

Modifications may be made to the foregoing embodiment within the scope of the present invention. As one example, instead of using a spring to bias the sensor holder against a seat, it would be possible to have the housing of a resilient material to resiliently grip the sensor holder, and in this case the sensor holder could be freed for adjustment by resilient deformation of the holder by a user. Alternatively, the sensor holder could be manipulated to the desired orientation by means of an elongated tail portion. The cooperating part-spherical surfaces could be provided with interengaging formations such as ridges and grooves to provide a click-stop action in predetermined orientations.

The invention thus provides a mounting arrangement which allows a low cost sensor to be mounted on and adjusted to suit a wide range of vehicles in a simple manner.

What is claimed is:

1. A sensor mounting arrangement for adjustably attaching a sensor in a panel of a vehicle, comprising a housing, and means for maintaining the sensor holder in a fixed orientation within the housing, and in which the sensor holder is adjustable within the housing about two axes, and said maintaining means fixes the position of the sensor holder within the housing after adjustment.

2. A sensor mounting arrangement according to claim 1, in which the housing has a part-spherical internal surface engaging a part-spherical outer surface of the sensor holder, whereby the orientation of the sensor holder with respect to the housing may be continuously adjusted.

3. A sensor mounting arrangement according to claim 1, in which said maintaining means comprises resilient means acting between the housing and the sensor holder.

4. A sensor mounting arrangement according to claim 1, in which the housing is adapted to be secured in a vehicle bumper.

5. A sensor mounting arrangement according to claim 4, in which the housing has a generally cylindrical outer shape for reception in a circular aperture in a vehicle bumper, and a front flange for abutting against the outer surface of the vehicle bumper.

6. A sensor mounting according to claim 5, in which serrations are provided on an outer surface of the housing adjacent the rear of said flange.

7. A sensor mounting arrangement according to claim 1, in which the housing comprises a front portion defining a cavity in which the sensor holder can be inserted, and a rear portion retaining the sensor holder within the housing.

8. A sensor mounting according to claim 7, in which the rear portion is secured to the front portion by a spring clip.

* * * * *